(No Model.) 2 Sheets—Sheet 1.
J. HORSCROFT.
POTATO PLANTER.
No. 546,535. Patented Sept. 17, 1895.
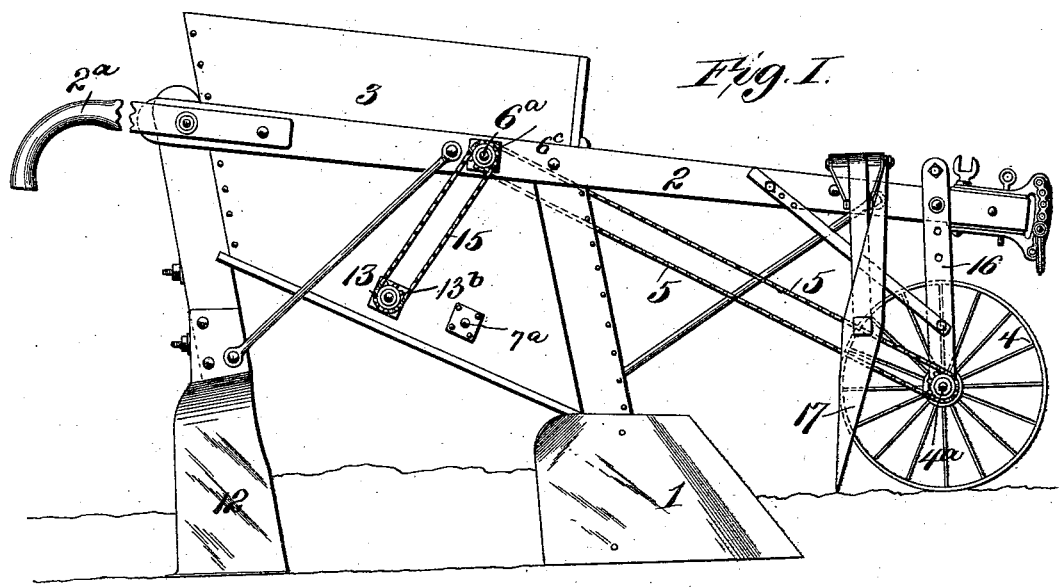
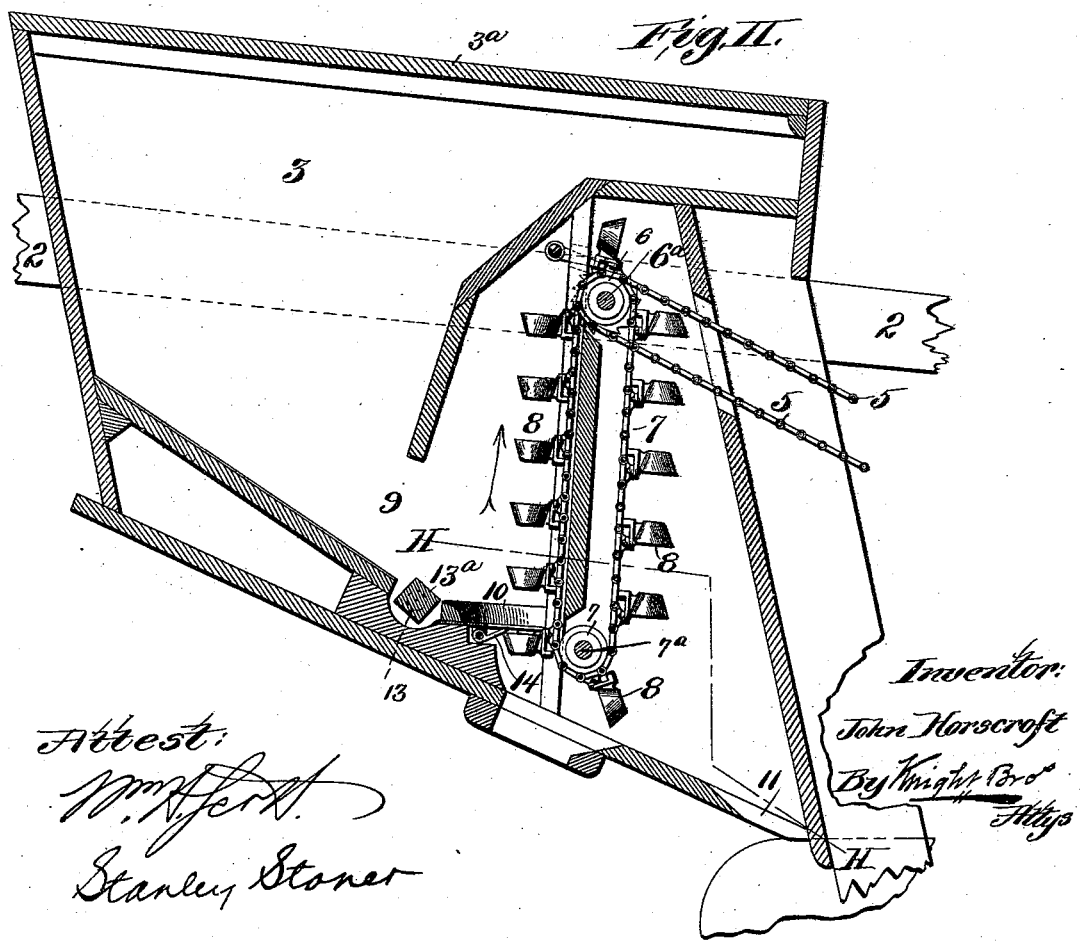

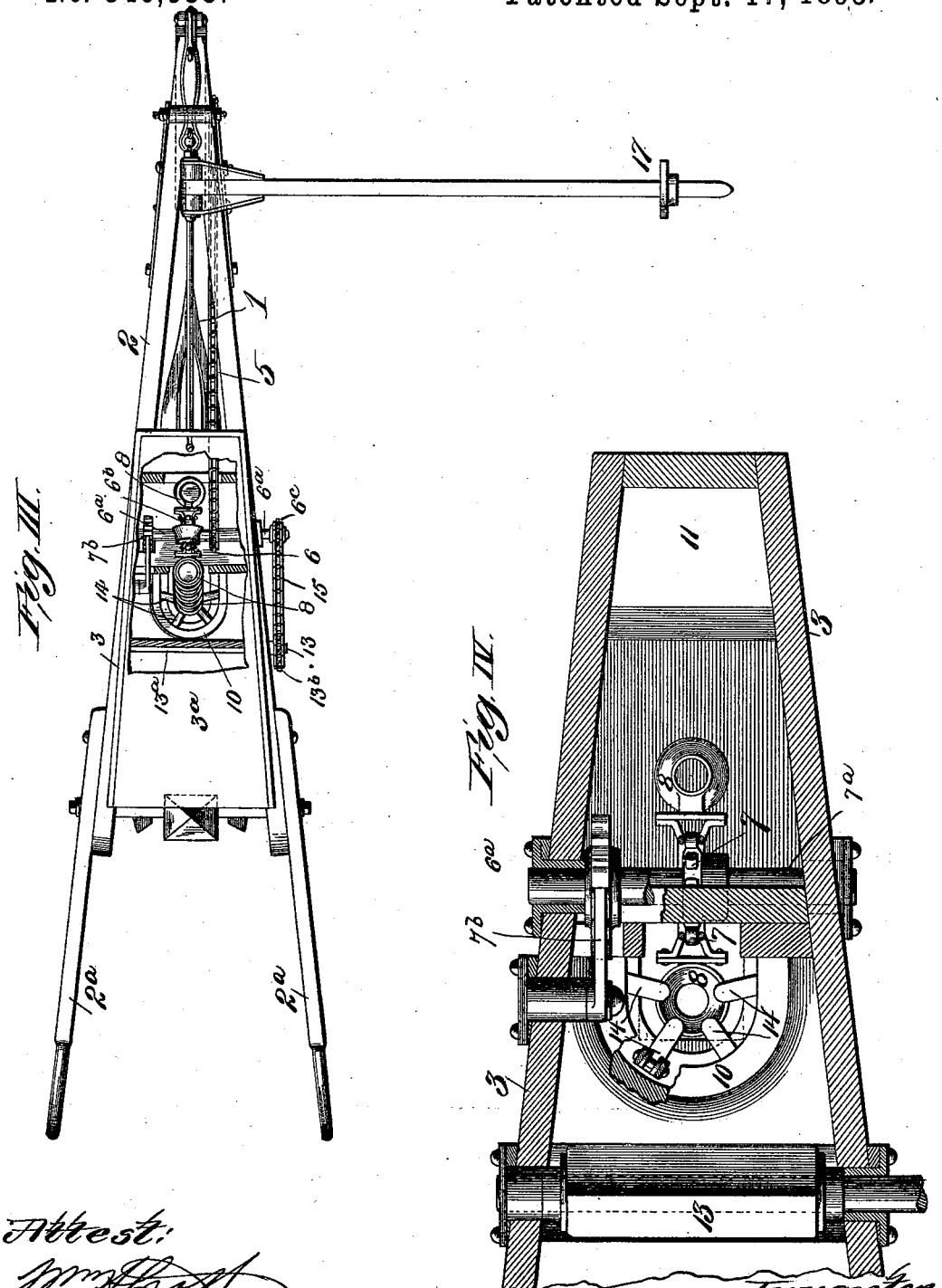

UNITED STATES PATENT OFFICE.

JOHN HORSCROFT, OF MOBERLY, MISSOURI.

POTATO-PLANTER.

SPECIFICATION forming part of Letters Patent No. 546,535, dated September 17, 1895.

Application filed February 15, 1895. Serial No. 538,522. (No model.)

*To all whom it may concern:*

Be it known that I, JOHN HORSCROFT, residing at the city of Moberly, in the county of Randolph and State of Missouri, have invented a new and useful Improvement in Potato-Planters, of which the following is a full, clear, and exact specification.

My invention relates to an improved device by means of which a furrow is opened, potatoes are deposited therein, and the furrow covered. It possesses features of novelty hereinafter fully described and claimed.

Referring to the drawings forming part of this specification, Figure I is a side elevation of my improved machine. Fig. II is a view of the hopper, the side thereof being removed. Fig. III is a top or plan view, the cover of the hopper being broken away. Fig. IV is a longitudinal section showing a view from above of the bottom of the hopper, taken on line II II of Fig. II.

The same numbers refer to the same parts throughout the four figures.

1 is the plow or furrow-opener.
2 is the frame, provided with the handles $2^a$.
3 is the hopper.
$3^a$ is the cover to the hopper.
4 is a wheel journaled in front of the furrow-opener, having attached to its axis a sprocket-wheel $4^a$.
5 is a drive-chain adapted to drive a second sprocket-wheel 6 on a shaft $6^a$. 7 is a second drive-chain propelled by the sprocket-wheel $6^b$ on the shaft $6^a$ and carrying the cups 8, as shown. The lower portion of the chain passes beneath an idle-wheel 7 on a shaft $7^a$.
$7^b$ is a pawl-and-ratchet mechanism for preventing the backward movement of the shaft $6^a$.
9 is a chute through which the potatoes pass from hopper 3, directing said potatoes onto the receiver 10.
11 is the exit out of which the potatoes are dropped into the furrow directly behind the plow 1.
12 is a covering-plow situated, as shown, behind the opening 11 and adapted to cover the potatoes.
13 is a shaft having flat sides $13^a$, providing a revolving guide or agitator, propelled by the drive-chain 15, carried by a sprocket-wheel $6^e$ on the shaft $6^a$, and driving a sprocket-wheel $13^b$ on the shaft of the guide, which latter is adapted to direct the potatoes from the hopper into the cups 8.

14 represents finger-guides placed within and under the receiver 10 to aid in directing the potatoes into the cups.

16 is the standard, to which is journaled the front wheel 4, said standard being bolted to frame 2, as shown. By raising or lowering this standard on frame 2 the depth of the furrow may be regulated.

17 is a marker or guide to regulate the distance between furrows, said marker being suitably attached to the frame 2.

The operation of my device is as follows: The potatoes prepared for planting are placed in the hopper 3. As the machine is drawn forward and the wheel 4 revolves the motion thereof is imparted through sprocket wheel and chain to shaft $6^a$. This in turn drives the chain 7, bearing the cups 8, and the chain 15, which drives the rotating guide 13. The potatoes pass from the hopper through the chute 9, over guide 13 and finger-guides 14, into the cups 8. These cups are placed at such distances on the chain 7 as desired, said distances governing the spaces at which the potatoes are dropped. The potatoes are picked up by cups 8 and dropped through the exit 11 into the furrow behind the plow and then covered by the covering-plow 12.

The device is very effectual for the purpose intended, and is durable, but inexpensive to build. The potatoes are dropped at equal distances, are placed at a depth easily regulated, and are properly covered after such planting.

I claim as my invention and desire to secure by Letters Patent—

A planter comprising a guide-wheel, a driving sprocket wheel on the axis of the guide-wheel, a hopper, the upper shaft extending across the hopper, provided with an inner sprocket-wheel, a belt wheel, and an outer sprocket-wheel, the chain carried by the driving sprocket-wheel and the inner sprocket-wheel, the lower shaft having an idle wheel, a cup chain extending over the belt wheel and idle wheel, the chute, the receiver at the base of the chute through which the cup chain
5 passes, the finger guides secured beneath the receiver, the guide shaft having flat sides and a sprocket-wheel, and located between the chute and the receiver and the chain carried by the outer sprocket-wheel on the guide shaft; substantially as described.

JOHN HORSCROFT.

In presence of—
J. W. DORSER,
GEO. H. KNIGHT.